Sept. 9, 1947.   A. WARRING   2,427,113
ELECTRICALLY HEATED HOODED DEVICE
Filed Feb. 8, 1945   2 Sheets-Sheet 1

INVENTOR.
ALFRED WARRING
BY
ATTORNEY

Sept. 9, 1947.  A. WARRING  2,427,113
ELECTRICALLY HEATED HOODED DEVICE
Filed Feb. 8, 1945   2 Sheets—Sheet 2
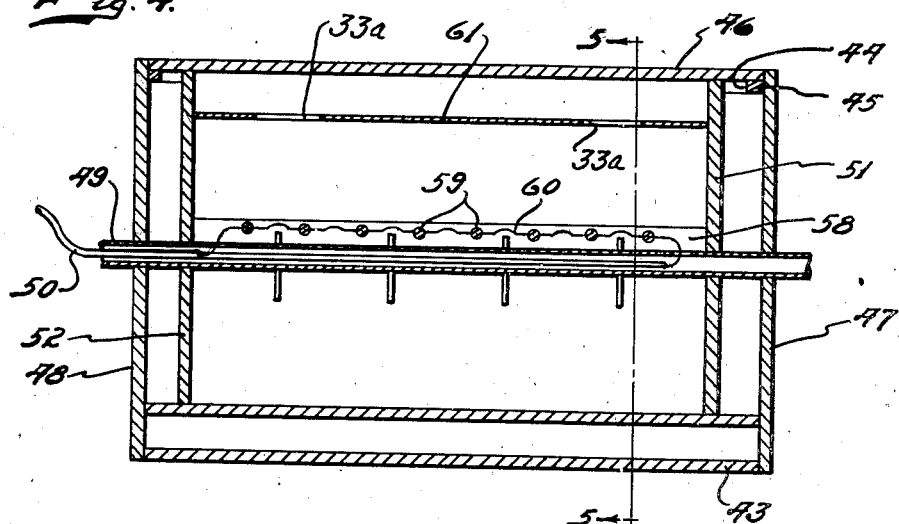
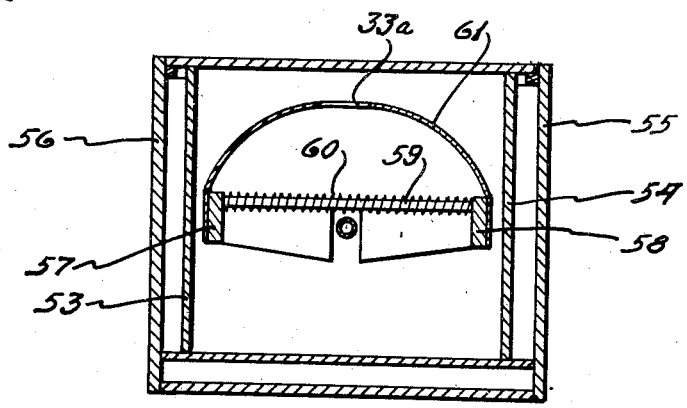
INVENTOR.
ALFRED WARRING
BY
ATTORNEY Patented Sept. 9, 1947

2,427,113

UNITED STATES PATENT OFFICE 2,427,113

ELECTRICALLY HEATED HOODED DEVICE

Alfred Warring, Detroit, Mich., assignor to Allen Industries, Inc., Detroit, Mich., a corporation of Delaware Application February 8, 1945, Serial No. 576,737

3 Claims. (Cl. 219—38)

My invention relates to a heating device adapted for heating various articles such as plates, drums and the like. In the heating of such articles experience has shown that it is difficult to obtain uniform heating over a large area and it is an object of the present invention to provide a heating device whereby such articles may be uniformly heated over their entire area.

It is another object of the invention to provide an indirect method of heating whereby the heat will be carried to the body to be heated by heat waves instead of by direct radiation or conduction.

Another object of the invention is to provide, in a heating device of this class, a heating element having a circulation producing hood thereover for inducing the travel of air currents so arranged and constructed that the air currents coming from the hood may be directed against the body to be heated in such a manner to effect uniform heating of the body over its entire area.

Another object of the invention is the provision of a heating element having a hood positioned thereover in spaced relation thereto open at its lower end and having air outlets at its upper end in close proximity to the object to be heated.

Other objects will appear hereinafter. It is recognized that various changes and modifications may be made in the detail of structure illustrated without departing from the spirit of the invention and it is intended that such changes and modifications shall be encompassed herein.

Figure 1:
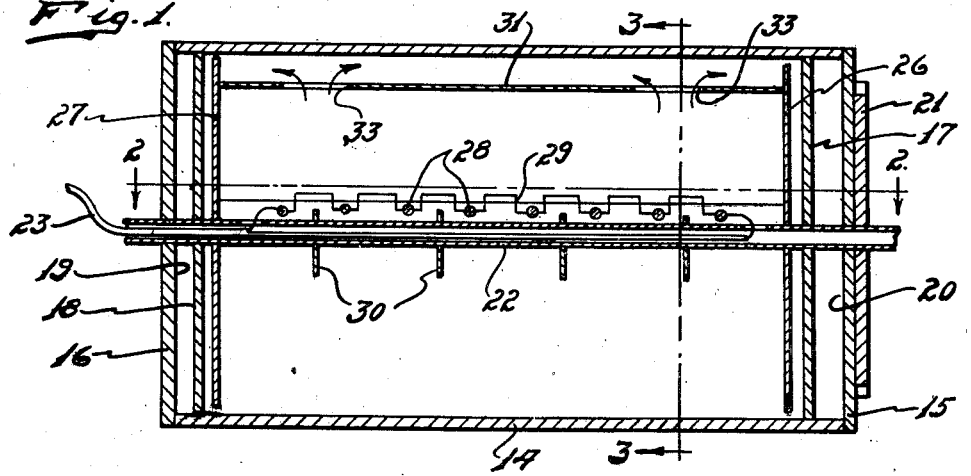
Figure 2:
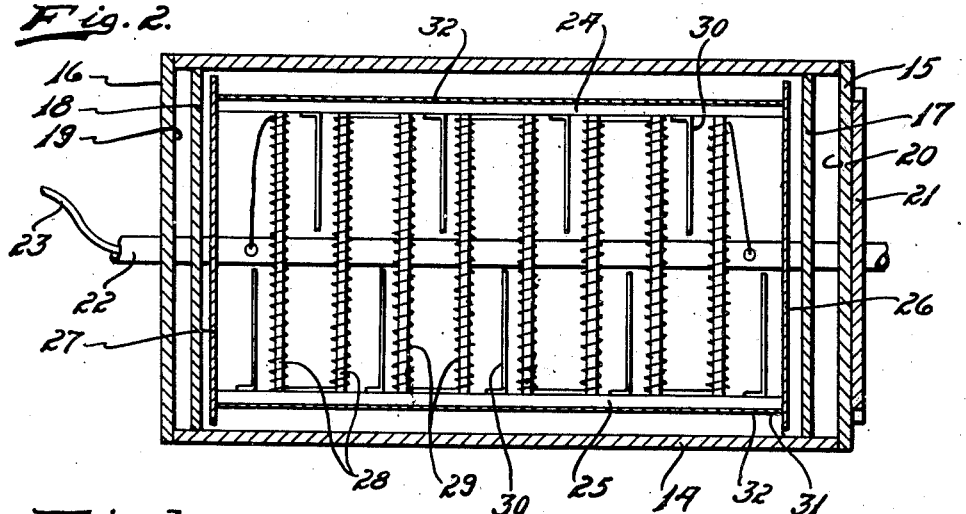
Figure 3:
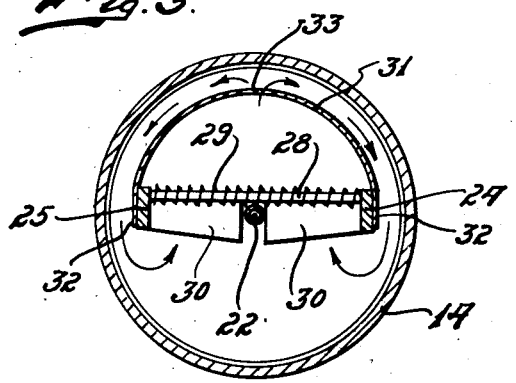

Forming a part of this application are drawings in which:

Fig. 1 is a longitudinal, central, vertical, sectional view of an embodiment of the invention, Fig. 2 is a sectional view taken on line 2—2 of Fig. 1, Fig. 3 is a sectional view slightly reduced in size taken on line 3—3 of Fig. 1, Fig. 4 is a longitudinal, central, vertical, sectional view of a modification of the structure shown in Fig. 1, Fig. 5 is a sectional view taken on line 5—5 of Fig. 4.

In the drawings I have illustrated the invention applied to a circular body or drum 14 having the end walls 15 and 16 with spacing plates 17 and 18 to provide the spaces 19 and 20 adjacent the end walls. Mounted on the end wall 15 is a gear 21 which may be rotated by any suitable mechanism so that the drum 14 may be rotated. Extending axially of the drum is a tubular member 22 into which is extended an electric conductor 23. Extended axially of the drum and at opposite sides of the tube 22 are the supports 24 and 25 which are secured to baffle plates 26 and 27, these baffle plates being welded or otherwise suitably mounted in fixed relation to the tube 22. The heating element which I have illustrated is merely a convenient form and is not shown with the intention of restricting this application to the specific heating element shown. In this element I have shown a plurality of supporting members 28 extending substantially diametrically of the drum 14 with the windings 29 thereon. The supporting members are supported at their opposite ends by the supports 24 and 25. Radiating fins 30 are carried by the supports 24 and 25 and positioned between the heating coils.

Positioned over the heating element is a hood embodying the substantially semi-circular member 31, the edge portions 32 of which are secured to the supports 24 and 25. This hood is suitably secured at its opposite ends to the baffle plates 26 and 27. Formed in the upper portion of the hood are slots 33.

The construction is such that when the drum 14 is rotated the tube 22 will remain stationary so that the heating element will remain stationary. When the current is turned on and the heat is produced, the air will of course become heated and, due to the structure and functioning of the hood, a flow of air currents in the direction indicated by the arrows will be effected. Experience has shown that this hood has a very important function in the operation of the device. By forming a hood in this manner and regulating the size of the slots 33 an application of heat to the overlying body uniformly distributed over the area thereof is effected. The hood shaped in the manner illustrated and positioned relatively to the heating element as shown induces the travel of the air currents. The currents flow upwardly from the heating element and pass outwardly through the slots. They then travel axially and circumferentially of the hood so that, even on bodies of considerable length and diameter, a uniform heating of the entire area becomes possible. The baffle plates 26 and 27 serve to turn the air currents downwardly so that those travelling axially in that direction are retarded and turned to travel downwardly and thence under the hood through the heating element and upwardly again. It is preferred that the slots be located at opposite sides of the medial line although this is not necessary, depending upon the nature of the device to be heated. In Fig. 4 and Fig. 5 I have illustrated a slight modification of the structure.

In this structure I have provided a supporting box-like body 43 having an open top 44 and provided with the supporting ledges 45 on which the body 46 which is to be heated may be positioned. Extending through the side walls 47 and 48 of this box-like structure is a tube 49 carrying the cable 50. The insulating walls 51, 52, 53 and 54 are spaced apart from the end walls 47 and 48 or the side walls 55 and 56. Mounted on the walls 51 and 52 are the supporting members 57 and 58 which serve as supports for the rods or arms 59 on which the windings 60 are located. Overlying this heating element is a hood 61 constructed in substantially the manner of the hood 31 shown in Fig. 1. The slits 33a correspond to the slits 33 of the structure shown in Fig. 1.

The function and operation of the structure shown in Fig. 4 is substantially the same as that of the device shown in Fig. 1, excepting that the heat is distributed over a flat body instead of over a curved body.

Heretofore much difficulty has been encountered in heating bodies of large area and experience with the structure set forth herein is such as to present that with proper distribution and control of the circulating air currents and proper inducing of the flow of air around the heating element a uniform heating of a large area may be accomplished.

What I claim as new is:

1. A heating device of the class described, comprising: a housing; a heating element mounted in said housing; a trough shaped hood mounted in inverted position over and in spaced relation to said heating element and in spaced relation throughout its entire area to the inner surface of the housing and having openings formed therein for emission of air currents therethrough for effecting a uniform heating of said surface of said housing.

2. A heating device of the class described, comprising: a housing; a heating element mounted in said housing; a trough shaped hood mounted in inverted position over and in spaced relation to said heating element and in spaced relation throughout its entire area to the inner surface of the housing and having openings formed therein for emission of air currents therethrough for effecting a uniform heating of said surface of said housing; said hood terminating with its lower edges in spaced relation to said heating element and in a plane substantially the plane of the heating element.

3. A heating device of the class described, comprising: a housing; a heating element mounted in said housing; a pair of spaced apart supporting members for supporting said heating element, said heating element comprising a plurality of spaced apart heating members; radiating fins mounted on said supporting members and projecting downwardly from the plane of said heating element and projecting inwardly from said supporting members between said heating members; a trough-shaped hood mounted on said supporting members in inverted position over and in spaced relation to said heating element and terminating with it slower edges at substantially the plane of said heating element and spaced from the inner surface of one of the sides of said housing and provided with outlet openings for the passage of air currents therethrough for effecting a uniform heating of said surface of said housing.

ALFRED WARRING.

REFERENCES CITED

The following references are of record in the file of this patent:

UNITED STATES PATENTS

| Number | Name | Date |
|---|---|---|
| 1,620,351 | Hnilo et al. | Mar. 8, 1927 |
| 2,074,455 | Carleton | Mar. 23, 1937 |
| 2,091,746 | Wiley | Aug. 31, 1937 |
| 1,581,426 | Coons | Apr. 20, 1926 |
| 1,258,904 | Hughes | Mar. 12, 1918 |
| 2,060,693 | Roniger | Nov. 10, 1936 |
| 1,037,965 | Mortimer | Sept. 10, 1912 |